United States Patent
Sagardoyburu

(10) Patent No.: US 10,210,785 B2
(45) Date of Patent: Feb. 19, 2019

(54) DISPLAY ASSEMBLY INCLUDING TWO SUPERPOSED DISPLAY DEVICES

(71) Applicant: The Swatch Group Research and Development Ltd, Marin (CH)

(72) Inventor: Michel Sagardoyburu, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 529 days.

(21) Appl. No.: 14/862,605

(22) Filed: Sep. 23, 2015

(65) Prior Publication Data

US 2016/0104410 A1 Apr. 14, 2016

(30) Foreign Application Priority Data

Oct. 10, 2014 (EP) .................................. 14188409

(51) Int. Cl.
*G09G 3/20* (2006.01)
*G02F 1/1335* (2006.01)

(52) U.S. Cl.
CPC ..... *G09G 3/2003* (2013.01); *G02F 1/133553* (2013.01); *G09G 2300/023* (2013.01)

(58) Field of Classification Search
CPC ... G09G 3/2003; G09G 2300/023; G09G 3/20
See application file for complete search history.

(56) References Cited

U.S. PATENT DOCUMENTS

| | | | |
|---|---|---|---|
| 6,034,752 A | 3/2000 | Khan et al. | |
| 6,147,934 A | 11/2000 | Arikawa et al. | |
| 6,169,708 B1 | 1/2001 | Kaneko et al. | |
| 6,297,864 B1 | 10/2001 | Kaneko et al. | |
| 6,377,321 B1 | 4/2002 | Khan et al. | |
| 6,654,080 B1 | 11/2003 | Khan et al. | |
| 2005/0036077 A1 | 2/2005 | Khan et al. | |
| 2007/0120785 A1* | 5/2007 | Kimura | G09G 3/3233 345/82 |
| 2009/0002580 A1* | 1/2009 | Matsushima | G02F 1/13338 349/12 |
| 2010/0315907 A1 | 12/2010 | Tanabe | |
| 2011/0043435 A1* | 2/2011 | Hebenstreit | G02B 26/005 345/5 |

FOREIGN PATENT DOCUMENTS

| | | | | |
|---|---|---|---|---|
| EP | 1 004 924 A1 | 5/2000 | | |
| JP | 2003-098984 | 4/2003 | | |
| JP | 2004038145 A | * 2/2004 | ......... | G02F 1/13471 |
| JP | 2006-276089 | 10/2006 | | |
| WO | WO 98/43129 A1 | 10/1998 | | |

OTHER PUBLICATIONS

European Search Report dated Jan. 14, 2015 in European Application 14188409.8, filed on Oct. 10, 2014 (with English translation).

* cited by examiner

*Primary Examiner* — Carolyn R Edwards
(74) *Attorney, Agent, or Firm* — Oblon, McClelland, Maier & Neustadt, L.L.P.

(57) ABSTRACT

Display assembly for a portable object, wherein the display assembly includes a first, at least partially transparent, emissive display device located on the side of an observer, a second reflective display device being arranged underneath the first emissive display device, wherein said second reflective display device is capable of switching between a transparent state, in which the device does not display any information, and a reflective state, when the device is activated.

15 Claims, 6 Drawing Sheets

DISPLAY ASSEMBLY INCLUDING TWO SUPERPOSED DISPLAY DEVICES

This application claims priority from European Patent Application No. 14188409.8 filed on Oct. 10, 2014, the entire disclosure of which is hereby incorporated herein by reference.

FIELD OF THE INVENTION

The present invention concerns a display assembly including two superposed display devices. More specifically, the present invention concerns such a display assembly intended to be housed inside a portable object such as a wristwatch.

BACKGROUND OF THE INVENTION

The readability of the information displayed by display devices such as liquid crystal display cells or organic light-emitting diode display devices is highly dependent on ambient lighting conditions. With some display devices, the displayed information can be read in good conditions in a lit environment, but is difficult to read in a dark environment. Conversely, other categories of display devices provide a good quality display in twilight or darkness, but are difficult to read in broad daylight.

By way of example, let us consider transflective liquid crystal display cells, that is to say liquid crystal display cells capable of displaying information that will be visible in daytime by exploiting the phenomenon of ambient light reflection, and which will also be visible at night by transmission using a backlight device. Such transflective liquid crystal display cells are optimised to provide the best possible reflection of sunlight and thus to ensure good readability of the displayed information in bright ambient conditions. However, in order for such transflective liquid crystal display cells to be capable of the best possible reflection of sunlight, their transmission efficiency is greatly restricted. Thus, when the backlight device is activated to allow the displayed information to be read in twilight, most of the light emitted by the backlight device is lost in absorption phenomena. Energy efficiency in this situation is therefore poor. Further, the optical qualities of the information displayed by the liquid crystal cell are highly dependent on the viewing angle.

As regards emissive display devices, such as organic light-emitting diode display devices, these devices have superior optical qualities to those of liquid crystal display cells, since optical qualities, such as luminance and colour, are not dependent on the viewing angle. Nonetheless, these high quality emissive display devices do not permit a reflective mode of operation. The information displayed thereby is thus very readable in twilight or darkness, but becomes difficult to read once observed outdoors. To overcome this problem, it is possible to increase the amount of current supplied to emissive display devices in order to ensure a minimum level of readability. However, even in normal conditions of use, these emissive display devices use more power than a reflective liquid crystal cell. Their electrical power consumption is therefore such that it is difficult to envisage keeping them permanently turned on, in particular when they are incorporated in a portable object of small dimensions, such as a wristwatch, whose only source of energy is a battery which is usually required to last for more than one year.

SUMMARY OF THE INVENTION

It is an object of the present invention to overcome the aforementioned problems in addition to others by providing a display assembly for a portable object such as a wristwatch which operates properly both in a brightly lit environment and in a dark environment.

To this end, the present invention concerns a display assembly for a portable object, this display assembly including a first, at least partially transparent, emissive display device located on the side of an observer, a second reflective display device being arranged, underneath the first emissive display device, the second reflective display device being capable of switching between a transparent state, when at rest, and a reflective state, when activated.

According to a complementary feature of the invention, the transparent emissive display device is fixed onto the reflective display device.

According to another feature of the invention, the transparent emissive display device is bonded onto the reflective display device by means of an adhesive film or a liquid adhesive layer.

As a result of these features, the present invention provides a display assembly for a portable object, such as a wristwatch, which operates in an optimum manner regardless of the ambient lighting conditions. In broad daylight, the information will preferably be displayed by the reflective display device. Indeed, this reflective display device, utilising a phenomenon of sunlight reflection to display information, is energy efficient. It can therefore remain permanently switched on and offers good readability of information. Conversely, in twilight or darkness, the information will be displayed by the emissive display device. Such an emissive display device uses more current than a reflective display device, but the information displayed thereby is visible at night or in darkness with very good optical properties which are notably independent of the viewing angle. Thus, unlike a transflective liquid crystal display cell, which attempts to reach a compromise between the reflectivity of its reflective mode, and the electrical power consumption of its backlight device in transmissive mode, the display assembly according to the invention proposes to combine two display devices, one purely reflective and the other purely emissive, without compromising the performance of either one of these two display devices.

According to one embodiment of the invention, the first display device includes a transparent emissive organic light-emitting diode display cell, and the second display device includes a twisted nematic, or super twisted nematic, or vertically aligned reflective liquid crystal display cell.

According to a complementary feature of the invention, the organic light-emitting diode display cell is arranged between a circular polarizer and a quarter-wave plate, the circular polarizer being placed on the side of the observer.

Addressing of the light-emitting areas of the organic light-emitting diode display cells is ensured by transparent electrodes, usually made with the aid of a metallic material or a metallic oxide. These electrodes thus quite often cause slight optical reflection phenomena which result in a degradation of contrast, which is detrimental to the readability of the information displayed by the organic light-emitting diode display cells. To overcome this drawback, the present invention teaches arranging the organic light-emitting diode display cells between a circular polarizer and a quarter-wave plate, the circular polarizer being placed on the side of the observer. Thus, one of the ambient light polarization components that penetrates the display assembly according to the invention is absorbed by the circular polarizer, whereas the other light polarization component is circularly polarized. When, on passing through the organic light-emitting diode display cell, the circularly polarized ambient light is partially reflected by the transparent electrodes of the organic light-emitting diode display cell, this reflected light undergoes a phase shift, which has the effect of transforming the circular polarization into a circular polarization in the opposite direction of rotation. Thus, when the reflected light passes through the circular polarizer again, it is absorbed thereby. In this manner, it is possible to eliminate stray light which is reflected onto the electrodes of the organic light-emitting diode display cell, and to retain only the light that passes through the organic light-emitting diode display cell without modification. Subsequently, the light is linearly polarized again after passing through the quarter-wave plate placed underneath the organic light-emitting diode display cell and will finally be absorbed or reflected by the reflective liquid crystal display cell depending upon whether a positive or negative contrast display is required.

According to a second embodiment of the invention, the first display device includes a transparent emissive organic light-emitting diode display cell, and the second display device includes a reflective display cell devoid of polarizers. The reflective display cell may be an electrophoretic display cell, a dichroic liquid crystal display cell or a cholesteric liquid crystal display cell.

The advantage of such an embodiment lies mostly in the fact that the intrinsically reflective nature, for example of an electrophoretic display cell, is used to obtain a display assembly according to the invention which operates in a suitable manner in both a strongly lit environment and in a dark environment. It is therefore possible to dispense with reflective and absorbent films, which makes it possible to achieve savings in terms of components and assembly time. Furthermore, the resulting display assembly is thinner, which is very advantageous especially in the case where it is desired to integrate such a display assembly, for example, in a wristwatch, where the available space is necessarily limited.

BRIEF DESCRIPTION OF THE DRAWINGS

Other features and advantages of the present invention will appear more clearly from the following detailed description of one embodiment of the display assembly according to the invention, this example being given solely by way of non-limiting illustration with reference to the annexed drawing, in which.

DETAILED DESCRIPTION OF ONE EMBODIMENT OF THE INVENTION

The present invention proceeds from the general inventive idea which consists in providing a display assembly which is capable of displaying information in a readable manner both in broad daylight and in twilight or darkness and which has optimal electrical energy consumption. To achieve this object, the present invention teaches combining an emissive display device with a display device that is arranged to be capable of switching between a rest state in which it is transparent and an active state in which it is capable of reflecting ambient light. The emissive display device is typically an organic light-emitting diode display cell, whereas the reflective display device is typically a liquid crystal display cell. For the display of information in broad daylight, use of the reflective display device is preferred, which, by the reflection of sunlight, can display information in a clear and readable manner with low electrical energy consumption. For the display of information in twilight or darkness, use of the emissive display device is preferred. Owing to its excellent optical properties, particularly in terms of contrast and colour reproduction, such an emissive display device makes it possible to display a large amount of information in a highly readable manner. In particular, the readability of the displayed information is not dependent on the viewing angle. Further, despite the twilight or darkness, it is possible to significantly reduce the energy consumption of such an emissive display device while ensuring good readability of the displayed information. There is therefore provided a display assembly that includes a reflective display device placed at the base of a stack and which is capable of permanently displaying information using very little energy, and an emissive display device, placed on the top of the stack and which is capable of displaying information on demand in a highly readable manner in twilight or darkness.

Figure 1:
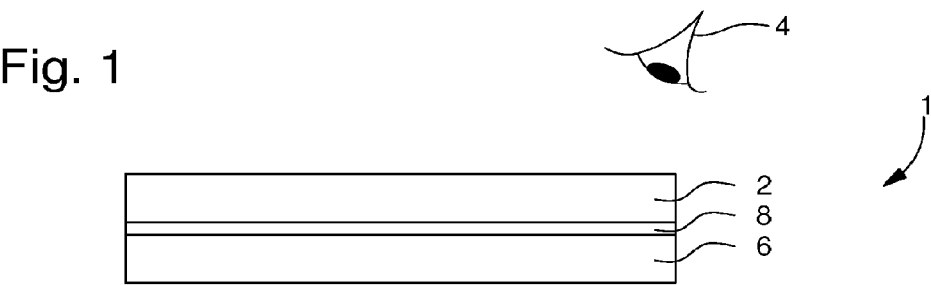
FIG. 1 is a schematic cross-section illustrating a display assembly according to the invention including a first, at least partially transparent, emissive display device situated on the side of an observer, a second reflective display device being arranged underneath the first emissive display device.

FIG. 1 is a schematic cross-section of a display assembly according to the invention. Designated as a whole by the general reference numeral 1, this display assembly includes a first, at least partially transparent, emissive display device 2 arranged on the side of an observer 4, and a second, also at least partially transparent, reflective display device 6, arranged underneath the first emissive display device 2. Within the meaning of the present invention, the first emissive display device 2 is capable of switching between a passive state in which it is at least partially transparent, and an active state in which it emits light to display information. The second reflective display device 6 is capable of switching between a passive state in which it is absorbent and an active state in which it is capable of reflecting ambient light.

Preferably, but not essentially, first emissive display device 2 is bonded on second reflective display device 6 by means of a transparent adhesive layer 8. This transparent adhesive layer 8 may be formed of an optical clear adhesive (or "OCA") or a layer of acrylic or silicone adhesive. The purpose of this transparent adhesive layer 8 is to prevent the problems of stray reflections which would occur if the two display devices 2, 6 were separated by an air layer and which would degrade the optical quality of display assembly 1 according to the invention.

Figure 2:
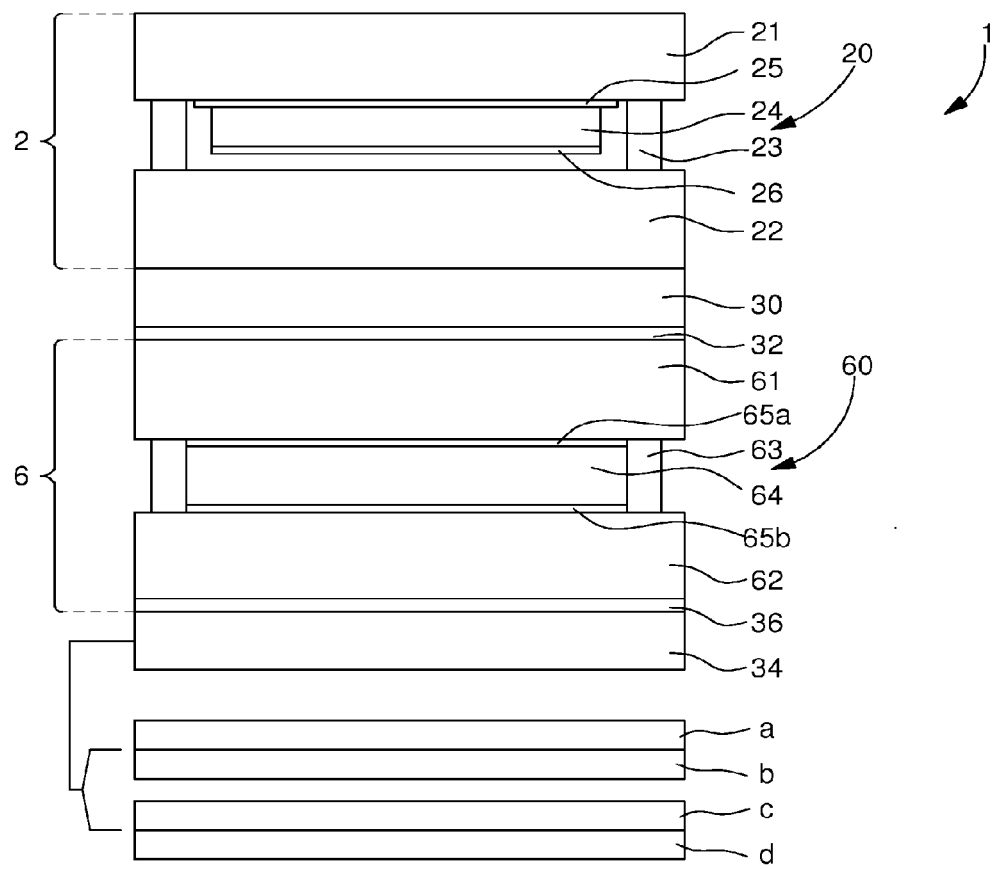
FIG. 2 is a cross-section of an example embodiment of a display assembly according to the invention wherein the first display device is a transparent, emissive, organic light-emitting diode display cell, and the second display device is a twisted nematic reflective liquid crystal display cell.

FIG. 2 is a detailed cross-sectional view of an example embodiment of display assembly 1 according to the invention, in the case where the first emissive display device 2 includes a transparent organic light-emitting diode display cell 20, referred to hereafter as a TOLED display cell. Second reflective display device 6 includes a reflective twisted nematic (TN) liquid crystal display cell 60.

More specifically, TOLED display cell 20 includes a transparent substrate 21 made of glass or of a plastic material and an encapsulation cover 22 which extends parallel to and remote from transparent substrate 21. Transparent substrate 21 and encapsulation cover 22 are joined to each other by a sealing frame 23 which delimits a closed volume shielded from air and humidity to contain a stack of electroluminescent layers generally designated by the reference number 24. An upper transparent electrode 25, made for example of indium-tin oxide or ITO, and a lower transparent electrode 26, made for example using a metallic material such as aluminium or gold or a metallic oxide such as ITO or zinc-indium oxide, are structured on both sides of the stack of electroluminescent layers 24. These electrodes 25, 26, made of a metallic material, are slightly reflective. The transparent organic light-emitting diode display cells are available either with direct addressing, in cases where they simply display icons or segments, or with passive matrix addressing in the case of a dot matrix display. In the case of a dot matrix display, it is also possible to use active matrix addressing combined with transparent thin film transistors (or "TFT") intended to control the current and which are arranged in display pixels located on the side of transparent substrate 21 of transparent TOLED display cell 20.

Further, reflective liquid crystal display 60 includes a front substrate 61 arranged on the side of the observer 4 and a rear substrate 62 which extends parallel to and remote from front substrate 61. Front substrate 61 and rear substrate 62 are joined to each other by a sealing frame 63 which delimits a sealed volume 64 for containing a liquid crystal whose optical properties are modified by application of a suitable voltage at a particular crosspoint between transparent electrodes 65a arranged on a lower face of front substrate 61 and transparent counter electrodes 65b arranged on an upper face of rear substrate 62. Electrodes 65a and counter electrodes 65b are made of a transparent electrically conductive material such as indium-zinc oxide or indium-tin oxide (ITO).

In the case of the present invention, any of the liquid crystal phases, such as twisted nematic (TN), super twisted nematic (STN) or vertically aligned (VA), may be envisaged. Likewise, all addressing schemes, such as direct addressing, active matrix addressing, or passive matrix multiplexing addressing may be envisaged.

An absorbing polarizer 30 is bonded on an upper surface of front substrate 61 of reflective liquid crystal display cell 60 by means of an adhesive layer 32. This adhesive layer 32 may be formed of an adhesive film or of a liquid adhesive layer. The adhesive used to bond absorbing polarizer 30 on reflective liquid crystal display cell 60 may be transparent or slightly diffusing depending on whether specular or diffuse reflection is required. Absorbing polarizer 30 may be, for example, an iodine or dye type polarizer.

A reflective absorbing polarizer 34 is bonded on a lower face of rear substrate 62 of reflective liquid crystal display cell 60 by means of an adhesive layer 36 which may be transparent or slightly diffusing depending on whether specular or diffuse reflection is required.

Within the meaning of the present invention, "absorbing reflective polarizer" 34 signifies a polarizer which reflects the light component whose direction of polarization is parallel to the axis of reflection of the absorbing reflective polarizer, and which absorbs the other light component whose direction of polarization is transverse to the direction of polarization of the light component reflected by the absorbing reflective polarizer 34. By way of preferred but non-limiting example, absorbing reflective polarizer 34 may be formed by an absorbing polarizer a disposed atop a reflector b, or a reflective transmissive polarizer c disposed atop an absorption layer d. Within the meaning of the present invention, a "reflective-transmissive polarizer" signifies a polarizer which reflects one of the light components and which allows to pass the other light component, whose direction of polarization is transverse to the direction of polarization of the light component reflected by the reflective transmissive polarizer d.

With reference to FIGS. 3A to 3D the operating principles of display assembly 1 according to the invention will now be examined depending on whether or not TOLED display cell 20 and reflective liquid crystal display cell 60 are in use. It will be assumed, purely by way of non-limiting illustration, that reflective liquid crystal display cell 60 is a twisted nematic (TN) liquid crystal cell and that the axis of transmission of absorbing polarizer 30 and the axis of reflection of reflective absorbing polarizer 34 are parallel.

Figure 3A:
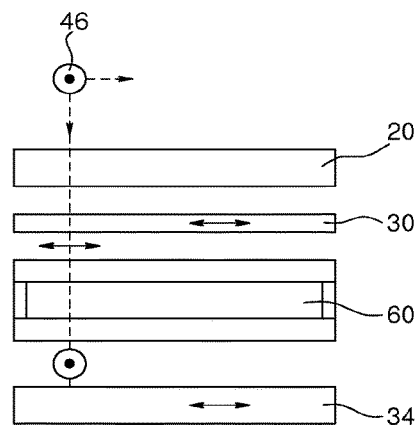
FIGS. 3A to 3D are schematic illustrations of the operating mode of the display assembly illustrated in FIG. 2 depending on whether the organic light-emitting diode display cell and the twisted nematic liquid crystal display cell are active or passive.

In FIG. 3A, TOLED display cell 20 and TN reflective liquid crystal display cell 60 are both switched off. The ambient light, designated by the reference number 46, passes unchanged through TOLED display cell 20 and is then linearly polarized by absorbing polarizer 30. Ambient light 46 undergoes a 90° rotation when it passes through TN reflective liquid crystal display cell 60, so that when it falls on absorbing reflective polarizer 34, its direction of polarization is perpendicular to the axis of reflection of absorbing reflective polarizer 34 and it is therefore absorbed by the latter. TN reflective liquid crystal display cell 60 thus appears dark when switched off, which means that the information that it will display will appear light on a dark background. The information display thus has a negative contrast. Of course, an information display with a positive contrast can be obtained simply by ensuring that the axis of transmission of polarizer 30 and the axis of reflection of absorbing reflective polarizer 34 are perpendicular.

Figure 3B:
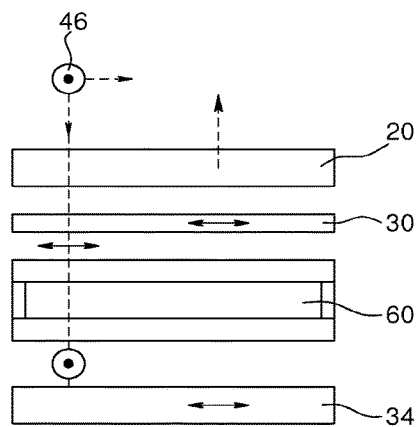

In FIG. 3B, TOLED display cell 20 is activated, whereas TN reflective liquid crystal display cell 60 is deactivated.

The light emitted by TOLED display cell 20 reaches observer 4 unchanged, whereas TN reflective liquid crystal display cell 60 appears dark. The information displayed by TOLED display cell 20 therefore stands out on a dark background.

Figure 3C:
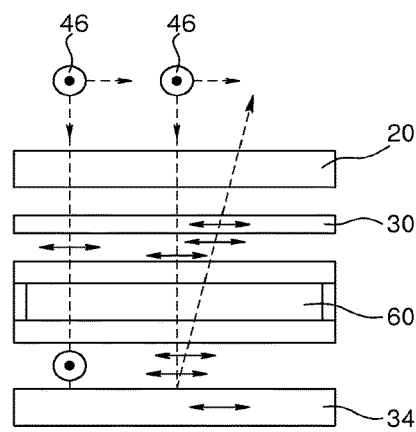

In FIG. 3C, TOLED display cell 20 is switched off, whereas TN reflective liquid crystal display cell 60 is activated. As already explained above, the non-switched areas of TN reflective liquid crystal display cell 60 appear dark. Conversely, in the switched areas of TN reflective liquid crystal display cell 60, ambient light 46 passes unchanged through these areas, so that ambient light 46 falls on absorbing reflective polarizer 34 with a direction of polarization parallel to the axis of reflection of absorbing reflective polarizer 34. Ambient light 46 is therefore reflected back and passes unchanged in succession through TN reflective liquid crystal display cell 60, absorbing polarizer 30 and TOLED display cell 20, so that it is perceptible to observer 4. The displayed information therefore appears light on a dark background.

Figure 3D:
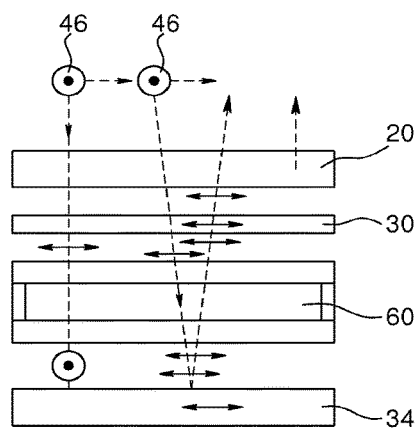

In FIG. 3D, TOLED display cell 20 and TN reflective liquid crystal display cell 60 are both activated. The light emitted by TOLED display cell 20 is directly perceptible to observer 4. Ambient light 46 which passes through the non-switched areas of TN reflective liquid crystal display cell 60 is absorbed by absorbing reflective polarizer 34 so that these areas appear dark. Finally, the ambient light 46 which passes through the switched areas of TN reflective liquid crystal display cell 60 is reflected by absorbing reflective polarizer 34, so that these areas appear light.

Figure 4:
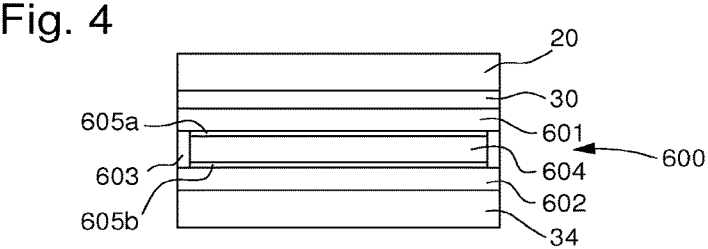
FIG. 4 is a similar view to that of FIG. 2, wherein the second display device is a vertically aligned reflective liquid crystal display cell.

FIG. 4 is a cross-sectional view of an example embodiment of display assembly 1 according to the invention in the case where first display device 2 includes the transparent emissive TOLED display cell 20. Second display device 6 includes a vertically aligned (VA) reflective liquid crystal display cell 600. VA reflective liquid crystal display cell 600 includes a front substrate 601 located on the side of the observer 4 and a rear substrate 602 which extends parallel to and remote from front substrate 601. Front substrate 601 and rear substrate 602 are joined to each other by a sealing frame 603 which delimits a sealed volume 604 for containing a liquid crystal whose optical properties are modified by application of a suitable voltage at a particular crosspoint between transparent electrodes 605a arranged on a lower face of front substrate 601 and transparent counter electrodes 605b arranged on an upper face of rear substrate 602. Electrodes 605a and counter electrodes 605b are, for example, made of indium tin oxide or "ITO". Absorbing polarizer 30 is fixed to an upper surface of front substrate 601 of VA reflective liquid crystal display cell 600. An absorbing polarizer 34 is fixed to a lower surface of rear substrate 602 of VA reflective liquid crystal display cell 600.

With reference to FIGS. 5A to 5D the operating principles of display assembly 1 according to the invention will be examined depending on whether or not TOLED display cell 20 and VA reflective liquid crystal display cell 600 are in use. It will be assumed, purely by way of non-limiting illustration, that the axis of transmission of absorbing polarizer 30 and the axis of reflection of absorbing reflective polarizer 34 are perpendicular.

Figure 5A:
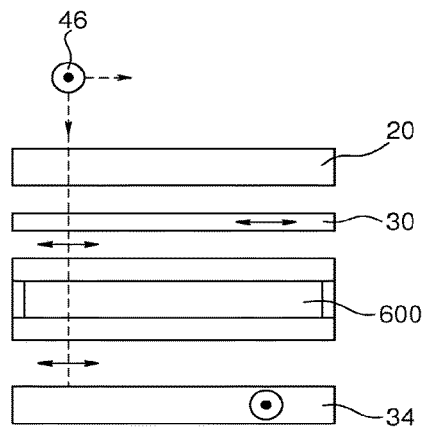
FIGS. 5A to 5D are schematic illustrations of the operating mode of the display assembly illustrated in FIG. 4 depending on whether the organic light-emitting diode display cell and the vertically aligned liquid crystal display cell are active or passive.

In FIG. 5A, TOLED display cell 20 and VA reflective liquid crystal display cell 600 are both switched off. The ambient light, designated by the reference number 46, passes unchanged in succession through TOLED display cell 20 and VA reflective liquid crystal display cell 600, so that when it falls on absorbing reflective polarizer 34, its direction of polarization is perpendicular to the axis of reflection of absorbing reflective polarizer 34 and it is therefore absorbed by said polarizer. VA reflective liquid crystal display cell 600 thus appears dark when switched off, which means that the information that it will display will appear light on a dark background. The information display thus has a negative contrast. Of course, an information display with a positive contrast can be obtained simply by ensuring that the axis of transmission of absorbing polarizer 30 and the axis of reflection of absorbing reflective polarizer 34 are parallel.

Figure 5B:
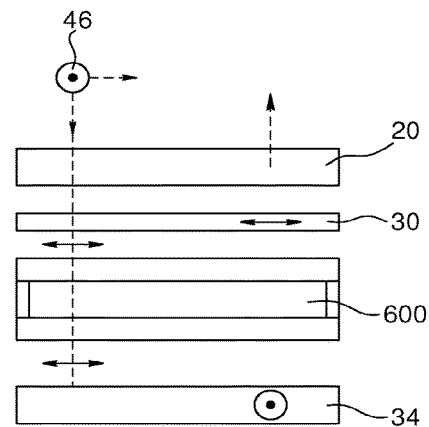

In FIG. 5B, TOLED display cell 20 is activated, whereas VA reflective liquid crystal display cell 600 is deactivated. The light emitted by TOLED display cell 20 reaches observer 4 unchanged, whereas VA reflective liquid crystal display cell 600 appears dark. The information displayed by TOLED display cell 20 therefore stands out on a dark background.

Figure 5C:
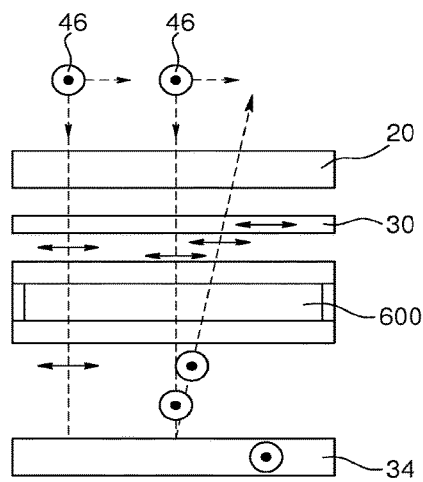

In FIG. 5C, TOLED display cell 20 is switched off, whereas VA reflective liquid crystal display cell 600 is activated.

In a vertically aligned liquid crystal display cell, the alignment layers are oriented at 45° with respect to the axes of polarization of the polarizers. Moreover, the result of the product between the birefringence of the liquid crystal molecules and the distance between the front and rear substrates is selected so that, when the liquid crystal is switched, it behaves like a half-wave plate as regards the direction of polarization. Consequently, since this half-wave plate is placed at 45° with respect to the axis of polarization of the absorbing polarizer, it causes a 90° rotation of the direction of polarization of the light. Thus ambient light 46 undergoes a 90° rotation when it passes through the switched areas of VA reflective liquid crystal display cell 600, so that when it falls on absorbing reflective polarizer 34, its direction of polarization is parallel to the axis of reflection of absorbing reflective polarizer 34 and it is therefore reflected by the latter. The ambient light 46 that passes through the non-switched areas of VA reflective liquid crystal display cell 600 is absorbed by absorbing reflective polarizer 34. The displayed information is therefore light on a dark background, i.e. with a negative contrast.

Figure 5D:
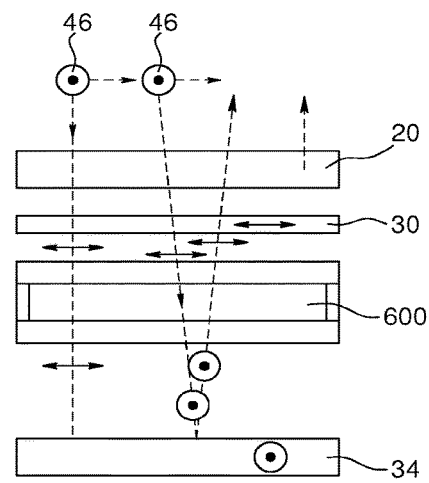

In FIG. 5D, TOLED display cell 20 and VA reflective liquid crystal display cell 600 are both activated. The light emitted by TOLED display cell 20 is directly perceptible to observer 4. The ambient light 46 that passes through the non-switched areas of VA reflective liquid crystal display cell 600 is absorbed by absorbing reflective polarizer 34 so that these areas appear dark. Finally, the ambient light 46 that passes through the switched areas of VA reflective liquid crystal display cell 600 is reflected by absorbing reflective polarizer 34, so that these areas appear light.

Figure 6:
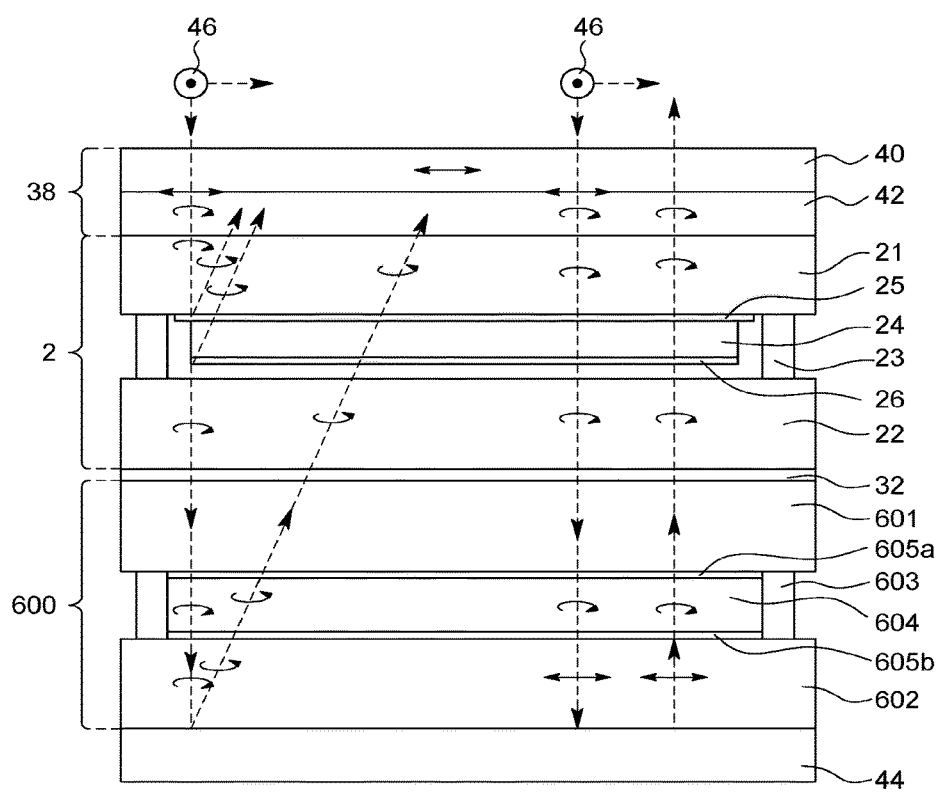
FIG. 6 is a detailed cross-sectional view of a variant embodiment of the display assembly according to the invention illustrated in FIG. 4, wherein a circular polarizer, formed of an absorbing polarizer and a quarter-wave plate, is placed atop the transparent organic light-emitting diode display cell.

FIG. 6 is a detailed cross-sectional view of a variant embodiment of the display assembly 1 according to the invention illustrated in FIG. 4. In order to remove stray reflections and thereby improve the display contrast, a circular polarizer 38, which is formed of a second absorbing polarizer 40 and a first quarter-wave plate 42, is placed atop TOLED display cell 20, on the side of observer 4. Further, absorbing reflective polarizer 34 is replaced by a metallic mirror 44. This variant also makes it possible to reduce the number of components and to reduce the parallax effect since metallic mirror 44 can be placed as close as possible to the switching plane of the liquid crystals.

Addressing of the light-emitting areas of the organic light-emitting diode display cells is ensured by transparent electrodes, usually made with the aid of a metallic material or a metallic oxide. These electrodes thus quite often cause optical reflection phenomena which result in a degradation of contrast, which is detrimental to the readability of the information displayed by the organic light-emitting diode display cells.

To overcome this drawback, the present invention teaches arranging a circular polarizer 38 above TOLED display cell 20 and a metallic mirror 44 underneath TOLED display cell 20. Thus, the ambient light 46 that penetrates display assembly 1 according to the invention is linearly polarized by second absorbing polarizer 40, then circularly polarized by first quarter-wave plate 42. When, on passing through TOLED display cell 20, the circularly polarized ambient light 46 is partially reflected by the transparent upper and lower electrodes 25, 26 of TOLED display cell 20, this reflected light undergoes a phase shift, which has the effect of transforming the circular polarization into a circular polarization in the opposite direction of rotation. Thus, when the reflected light passes through circular polarizer 38 again, it is absorbed thereby. In this manner, it is possible to remove the stray light which is reflected on electrodes 25, 26 of TOLED display cell 20. The remaining ambient light 46 passes unchanged through TOLED display cell 20, the VA reflective liquid crystal display cell 600 and is finally reflected by metallic mirror 44 which reverses the direction of circular polarization. Thus, after having passed unchanged again through VA reflective liquid crystal display cell 600 and TOLED display cell 20, ambient light 46 is finally absorbed by circular polarizer 38.

The display is thus light on a dark background. In other words, display assembly 1 has a negative contrast. Indeed, when the ambient light 46, which was circularly polarized by circular polarizer 38 and which then passes unchanged through TOLED display cell 20, passes through the switched areas of VA reflective liquid crystal display cell 600, it is linearly polarized. Consequently, when ambient light 46 is reflected on metallic mirror 44, its direction of polarization remains linear. However, when ambient light 46 passes through VA reflective liquid crystal display cell 600 again, it is circularly polarized in the same direction as the circular polarization imparted by circular polarizer 38, when it entered display assembly 1. Consequently, it can pass through circular polarizer 38 without being absorbed and is finally perceptible to the observer 4.

Figure 7:
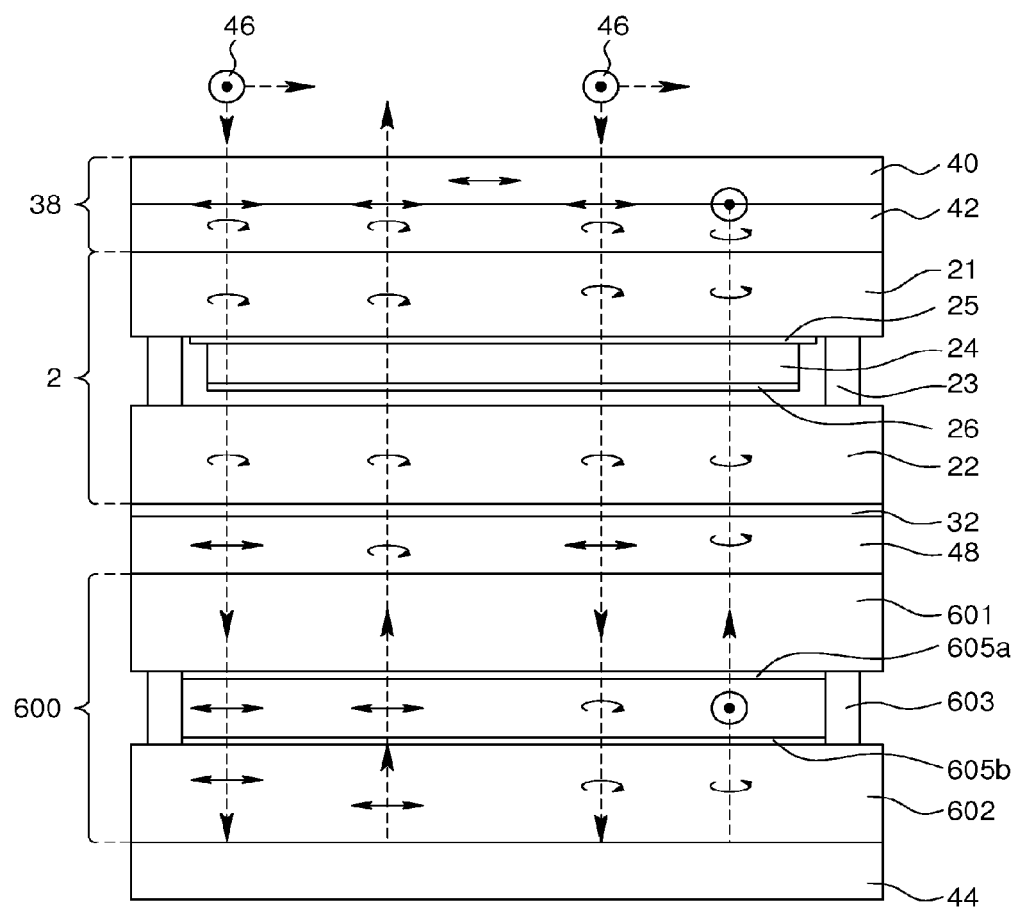
FIG. 7 is a schematic cross-sectional view illustrating a display assembly according to the invention including a transparent emissive organic light-emitting diode display cell, and the second display device is a reflective liquid crystal display cell, the organic light-emitting diode display cell being disposed between a circular polarizer and a quarter-wave plate, the circular polarizer being placed on the side of the observer.

FIG. 7 is a similar view to that of FIG. 6, except that a second quarter-wave plate 48 is placed between TOLED display cell 20 and VA reflective liquid crystal display cell 600. This second quarter-wave plate 48 is parallel to first quarter-wave plate 42 or arranged at 90° relative to first quarter-wave plate 42.

After circular polarization by circular polarizer 38, the ambient light 46 that enters display assembly 1 passes through TOLED display cell 20 unchanged, and is then converted into linearly polarized light after passing through second quarter-wave plate 48. The linearly polarized ambient light 46 then passes unchanged through the non-switched areas of VA reflective liquid crystal display cell 600 and is finally reflected unchanged by metallic mirror 44. On its return, ambient light 46 follows the same path and is finally perceptible to observer 4. In the switched areas of VA reflective liquid crystal display cell 600, ambient light 46, initially linearly polarized after passing through second quarter-wave plate 48, is circularly polarized by VA reflective liquid crystal display cell 600. Ambient light 46 is then reflected by metallic mirror 44, so that it undergoes a phase shift causing its circular polarization to transform into circular polarization in the opposite direction of rotation. On passing through the switched areas of VA reflective liquid crystal display cell 600 again, ambient light 46 returns to a linear polarization oriented at 90° with respect to its linear polarization on the outward path. It then passes through second quarter-wave plate 48 and is circularly polarized in the opposite direction of rotation to its direction of rotation on the outward path. Ambient light 46 passes through TOLED display cell 20 unchanged and is finally linearly polarized by first quarter-wave plate 42 at 90° with respect to its linear polarization on the outward path. It is therefore absorbed by absorbing linear polarizer 40. The display is thus dark on a light background. In other words, display assembly 1 has a positive contrast.

Figure 8:
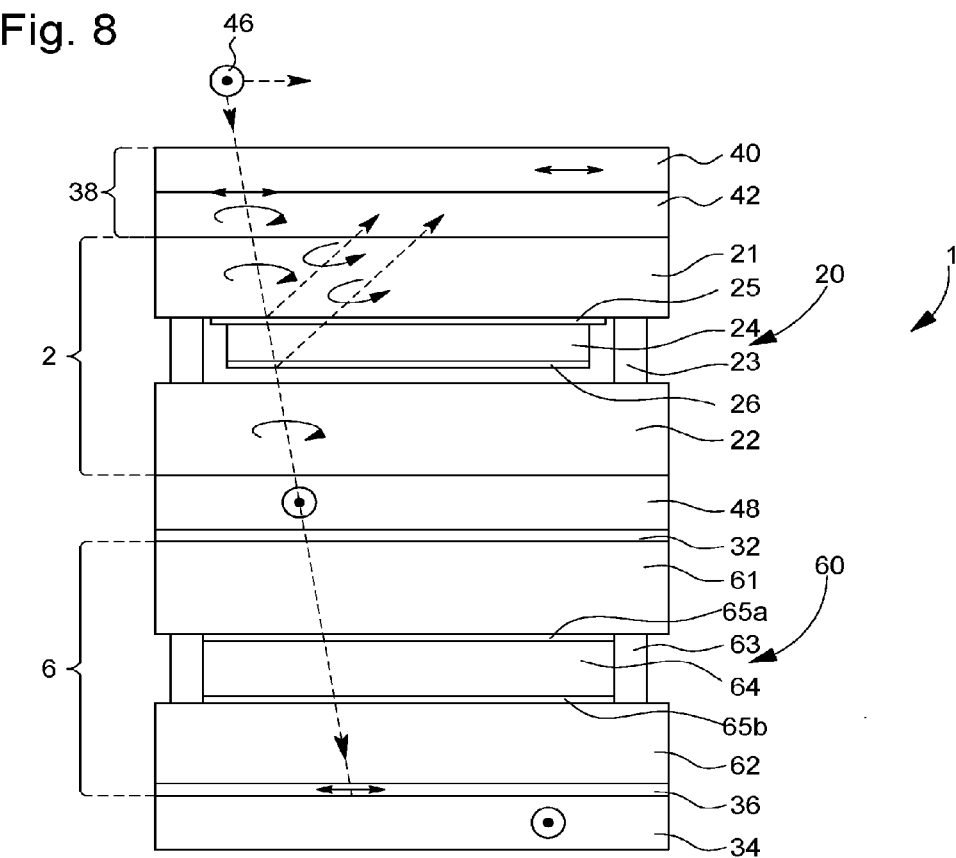
FIG. 8 is a schematic cross-sectional view illustrating a display assembly according to the invention including a transparent OLED display cell, disposed atop an electrophoretic reflective display cell.

FIG. 8 is a similar view to that of FIG. 2 except that, in order to remove stray reflections and thereby improve the display contrast, circular polarizer 38, which is formed of second absorbing polarizer 40 and first quarter-wave plate 42, is placed atop TOLED display cell 20, on the side of observer 4. Moreover, second quarter-wave plate 48 is placed underneath TOLED display cell 20. This second quarter-wave plate 48 is parallel to first quarter-wave plate 42 or arranged at 90° relative to first quarter-wave plate 42. It will be assumed that the axis of transmission of second absorbing polarizer 40 and the axis of reflection of absorbing reflective polarizer 34 are perpendicular.

Thus, the ambient light 46 that penetrates display assembly 1 according to the invention is linearly polarized by second absorbing polarizer 40, then circularly polarized by first quarter-wave plate 42. When, on passing through TOLED display cell 20, the circularly polarized ambient light 46 is partially reflected by the transparent upper and lower electrodes 25, 26 of TOLED display cell 20, this reflected light undergoes a phase shift, which has the effect of transforming the circular polarization into a circular polarization in the opposite direction of rotation. Thus, when the reflected light passes through circular polarizer 38 again, it is absorbed thereby. In this manner, it is possible to remove the stray light which is reflected on electrodes 25, 26 of TOLED display cell 20. The remaining ambient light 46 passes unchanged through TOLED display cell 20 and is then linearly polarized during its passage through second quarter-wave plate 48 in a direction perpendicular to the axis of transmission of second absorbing polarizer 40. Indeed, it is assumed that the first and second quarter-wave plates 42 and 48 are parallel to each other. During the passage of ambient light 46 through reflective liquid crystal display cell 60, the direction of polarization of ambient light 46 is rotated through 90°, so that it is finally absorbed by absorbing reflective polarizer 34.

The display is thus light on a dark background. In other words, display assembly 1 has a negative contrast. Indeed, in the switched areas of reflective liquid crystal display cell 60, ambient light 46 passes unchanged through reflective liquid crystal display cell 60, so that it falls on absorbing reflective polarizer 34 in a direction of polarization which is parallel to the axis of reflection of the latter. Ambient light 46 is therefore reflected by absorbing reflective polarizer 34, then passes unchanged through reflective liquid crystal display cell 60. Ambient light 46 is then circularly polarized by second quarter-wave plate 48, then passes unchanged through circular polarizer 38 and is perceptible to observer 4.

By way of variant, it is possible to envisage arranging the second quarter-wave plate 48 between reflective liquid crystal display cell 60 and reflective absorbing polarizer 34.

Figure 9:
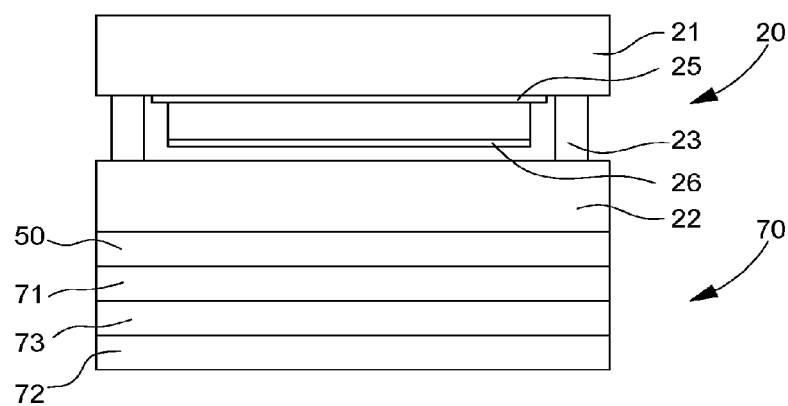
FIG. 9 is a schematic view illustrating a display assembly according to the invention wherein the reflective display cell is an electrophoretic display cell adhesive bonded underneath the transparent emissive organic light-emitting diode display cell by means of an adhesive layer.

According to a second variant embodiment of the invention, the first display device includes the transparent emissive organic light-emitting diode display 20 and the second display device includes a reflective display cell devoid of polarizers. The reflective display cell may be an electrophoretic display cell, a dichroic liquid crystal display cell or a cholesteric liquid crystal display cell (for example with electronic ink or e-ink). In the example illustrated in FIG. 9, the reflective display cell is an electrophoretic display cell 70 bonded underneath the transparent emissive organic light-emitting diode display cell 20, by means of an adhesive layer 50. This electrophoretic display cell 70 includes a front substrate 71 and a rear substrate 72 between which is arranged the optically active layer 73, resulting from a mixture of two different coloured powders, typically black and white. Front substrate 71 is a transparent substrate on the lower face of which is arranged an electrode. Rear substrate 72 may be a printed circuit board on the upper face of which counter electrodes are structured.

According to a variant, the reflective display cell is of the cholesteric liquid crystal type, and a circular polarizer is disposed atop the transparent organic light-emitting diode display cell to absorb the stray reflections produced by the display cell electrodes. Indeed, a cholesteric liquid crystal display cell has the peculiarity of reflecting circular polarization of light. This circular polarization will thus be able to pass through the circular polarizer without being absorbed.

It goes without saying that this invention is not limited to the embodiments that have just been described and that various simple alterations and variants can be envisaged by those skilled in the art without departing from the scope of the invention as defined by the annexed claims. In particular, in the case of a dichroic liquid crystal display cell, the presence of dichroic dyes (black or coloured), dispersed in the liquid crystal, allows ambient light to be absorbed without the use of polarizers.

LIST OF PARTS

Display assembly 1
First emissive display device 2
Observer 4
Second reflective display device 6
Transparent adhesive layer 8
TOLED display cell 20
Transparent substrate 21
Encapsulation cover 22
Sealing frame 23
Stack of electroluminescent layers 24
Transparent upper electrode 25
Lower transparent electrode 26
Absorbing polarizer 30
Adhesive layer 32
Reflective absorbing polarizer 34
Adhesive layer 36
Absorbing polarizer a
Reflector b
Reflective transmissive polarizer c
Absorption layer d
Circular polarizer 38
Second absorbing polarizer 40
First quarter-wave plate 42
Metallic mirror 44
Ambient light 46
Second quarter-wave plate 48
Adhesive layer 50
TN reflective liquid crystal display cell 60
Front substrate 61
Rear substrate 62
Sealing frame 63
Sealed volume 64
Transparent electrodes 65a
Transparent counter electrodes 65b
VA reflective liquid crystal display cell 600
Electrophoretic display cell 70
Front substrate 71
Rear substrate 72
Optically active layer 73

What is claimed is:

1. A display assembly for a portable object, the display assembly comprising:
    a first, at least partially transparent, emissive display device, and
    a second reflective display device arranged underneath the first emissive display device,
    wherein the second reflective display device is capable of switching between a transparent state, in which the device does not display any information, and a reflective state, when the device is activated,
    wherein the first emissive display device includes a transparent emissive organic light-emitting diode display cell, and wherein the second reflective display device includes a reflective liquid crystal display cell,
    wherein a circular polarizer, which is formed of an absorbing polarizer and a first quarter-wave plate, is placed above the transparent emissive organic light-emitting diode display cell, and
    wherein a second quarter-wave plate is placed underneath the transparent emissive organic light-emitting diode display cell, the second quarter-wave plate being parallel to the first quarter-wave plate or arranged at 90° relative to the first quarter-wave plate.

2. The display assembly according to claim 1, wherein the emissive display device is fixed to the reflective display device.

3. The display device according to claim 2, wherein the emissive display device is bonded on the reflective display device by means of an adhesive film or a liquid adhesive layer.

4. The display assembly according to claim 3, wherein the reflective liquid crystal display cell is devoid of polarizers.

5. The display assembly according to claim 2, wherein the reflective liquid crystal display cell is devoid of polarizers.

6. The display assembly according to claim 1, wherein the transparent emissive organic light-emitting diode display cell includes a stack of electroluminescent layers sandwiched between a transparent upper electrode and a transparent lower electrode.

7. The display assembly according to claim 6, wherein the reflective liquid crystal display cell is selected from the group comprising twisted nematic liquid crystal cells, super twisted nematic liquid crystal cells and vertically aligned liquid crystal display cells and in that the addressing of these liquid crystal display cells may be of the direct type, the active matrix type or the passive matrix multiplexing type.

8. The display assembly according to claim 7, wherein an absorbing polarizer is arranged on an upper face of the reflective liquid crystal display cell, and wherein an absorbing reflective polarizer is arranged underneath a lower face of the reflective liquid crystal display cell.

9. The display assembly according to claim 8, wherein the absorbing reflective polarizer may be formed by an absorbing polarizer (a) disposed atop a reflector (b), or a reflective transmissive polarizer (c) disposed atop an absorption layer (d).

10. The display assembly according to claim 6, wherein an absorbing polarizer is arranged on an upper face of the reflective liquid crystal display cell, and wherein an absorbing reflective polarizer is arranged underneath a lower face of the reflective liquid crystal display cell.

11. The display assembly according to claim 10, wherein the absorbing reflective polarizer may be formed by an absorbing polarizer disposed atop a reflector, or a reflective transmissive polarizer disposed atop an absorption layer.

12. The display assembly according to claim 1, wherein an absorbing polarizer is arranged on an upper face of the reflective liquid crystal display cell, and wherein an absorbing reflective polarizer is arranged underneath a lower face of the reflective liquid crystal display cell.

13. The display assembly according to claim 12, wherein the absorbing reflective polarizer may be formed by an absorbing polarizer disposed atop a reflector, or a reflective transmissive polarizer disposed atop an absorption layer.

14. The display assembly according to claim 1, wherein the reflective liquid crystal display cell is devoid of polarizers.

15. The display assembly according to claim 14, wherein the reflective display cell is an electrophoretic display cell, a dichroic liquid crystal display cell or a cholesteric liquid crystal display cell.

* * * * *